(12) United States Patent
Erickson et al.

(10) Patent No.: US 11,696,383 B2
(45) Date of Patent: Jul. 4, 2023

(54) CONTINUOUS SAFETY LIGHT

(71) Applicant: Magna Exteriors Inc., Concord (CA)

(72) Inventors: Larry R. Erickson, Birmingham, MI (US); Robert M. Horner, Ferndale, MI (US)

(73) Assignee: Magna Exteriors Inc., Aurora (CA)

( * ) Notice: Subject to any disclaimer, the term of this patent is extended or adjusted under 35 U.S.C. 154(b) by 0 days.

(21) Appl. No.: 16/878,790

(22) Filed: May 20, 2020

(65) Prior Publication Data

US 2020/0375006 A1    Nov. 26, 2020

Related U.S. Application Data

(60) Provisional application No. 62/965,522, filed on Jan. 24, 2020, provisional application No. 62/850,235, filed on May 20, 2019.

(51) Int. Cl.
| | |
|---|---|
| *H05B 47/115* | (2020.01) |
| *H05B 47/155* | (2020.01) |
| *H05B 47/165* | (2020.01) |
| *H05B 45/10* | (2020.01) |
| *B60Q 1/46* | (2006.01) |

(52) U.S. Cl.
CPC .............. *H05B 47/115* (2020.01); *B60Q 1/46* (2013.01); *H05B 45/10* (2020.01)

(58) Field of Classification Search
CPC .......... B60Q 1/46; B60Q 1/0035; B60Q 1/22; B60Q 1/24; B60Q 1/2611; B60Q 1/2669; B60Q 1/268; B60Q 1/323; B60Q 1/50; B60Q 1/525; B60Q 2400/40; B60Q 2400/50; H05B 45/10; H05B 47/115; Y02B 20/40

See application file for complete search history.

(56) References Cited

U.S. PATENT DOCUMENTS

| | | | | |
|---|---|---|---|---|
| 8,581,688 | B2* | 11/2013 | Breed ............... | B60R 21/01552 |
| | | | | 340/3.1 |
| 9,475,422 | B2* | 10/2016 | Hillis ....................... | B60Q 1/50 |
| 2012/0206050 | A1* | 8/2012 | Spero ................... | B60Q 1/1423 |
| | | | | 315/152 |
| 2016/0129832 | A1* | 5/2016 | Zakhem ................. | B60K 35/00 |
| | | | | 315/77 |
| 2018/0319320 | A1* | 11/2018 | Tatara .................... | F21S 41/365 |
| 2019/0054852 | A1* | 2/2019 | Wickramasinghe .. | F21S 41/663 |
| 2019/0270405 | A1* | 9/2019 | Fukumoto ............... | B60Q 1/50 |
| 2019/0315267 | A1* | 10/2019 | Salter ....................... | B60Q 1/24 |

* cited by examiner

*Primary Examiner* — Henry Luong
(74) *Attorney, Agent, or Firm* — Warn Partners, P.C.

(57) ABSTRACT

An illumination system and method of ground and other illuminating that comprises a plurality of sensors that scan/detect the exterior area around the vehicle and at least one controller, the system selectively turning on/off a series of lighting elements placed strategically around the vehicle to allow light to be directed to at least one ground or other surface at the persons at all times or any predetermined time. A controller is provided to activate ground lighting in coordination with sensor signals identifying where an individual or object are located in predetermined proximity to the vehicle.

20 Claims, 15 Drawing Sheets

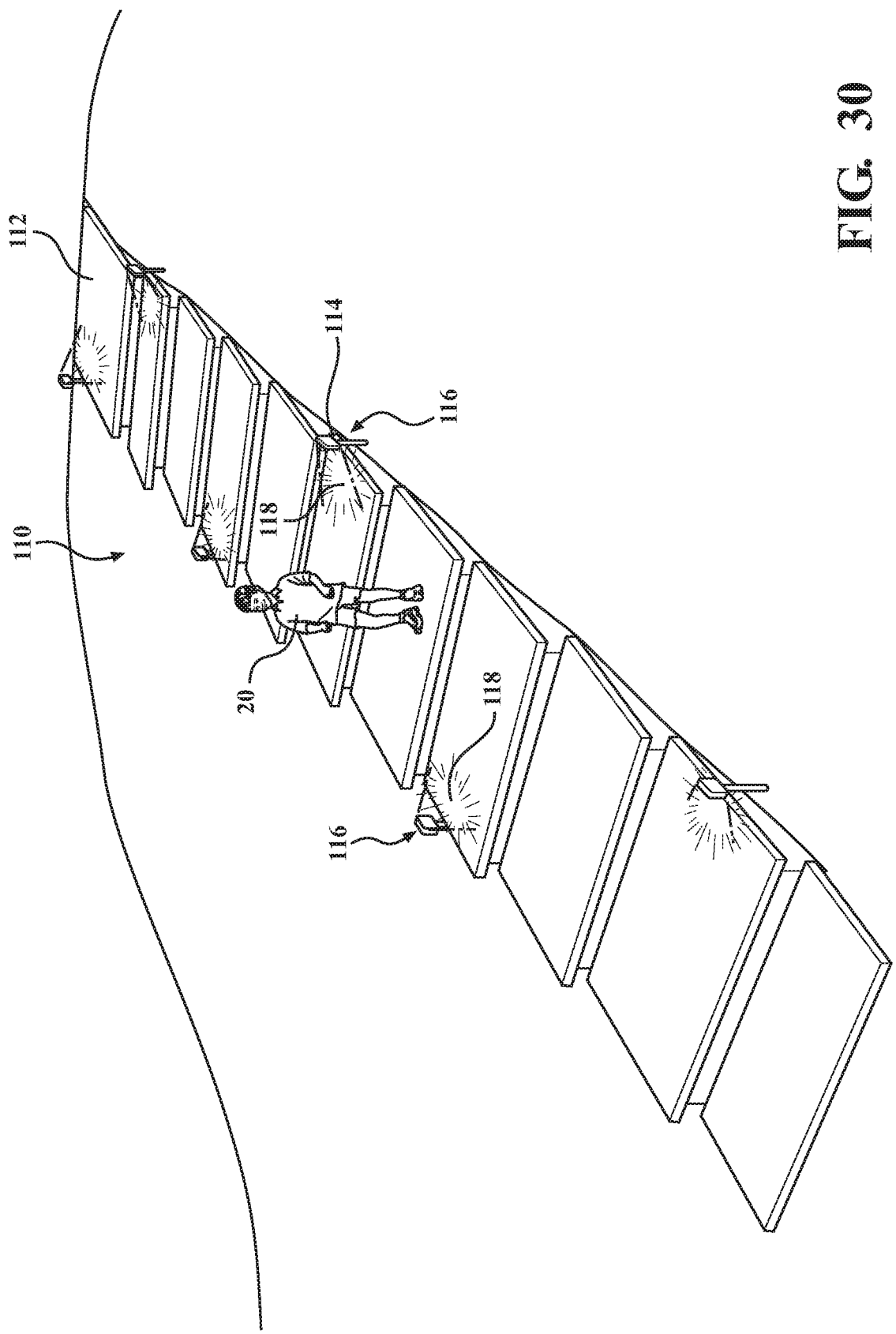

CONTINUOUS SAFETY LIGHT

CROSS REFERENCE TO RELATED APPLICATIONS

This application is a non-provisional patent application and claims the benefit of U.S. Provisional Patent Application No. 62/850,235, filed May 20, 2019 and of U.S. Provisional Patent Application No. 62/965,522, filed Jan. 24, 2020. The disclosures of the above applications are incorporated herein by reference.

FIELD OF INVENTION

The present invention relates to multifunctional lighting.

BACKGROUND OF THE INVENTION

The lighting on current vehicles does not provide sufficient lighting of the ground immediately around the vehicle. Currently vehicle lighting also does not provide adequate targeted illumination, messaging and multi-functional lighting elements. In particular, current lighting does not turn on/off when a person moves within predetermined areas in the vicinity of the vehicle.

There are vehicles that use lights to light up the ground, but it is usually only small amounts of the ground around the vehicle that can be illuminated. They also have limited functionality. In addition, those lights are fixed position and the locations of illumination cannot be changed.

Accordingly, there exists a need for a system that selectively illuminates in predetermined directions at predetermined locations relative to the vehicle where a person is in proximity to the vehicle and is adaptable to detect any predetermined conditions or proximity with object/people and provide predetermined desired illumination, messaging, projection interface, and any predetermined combination(s) of lighting features.

SUMMARY OF THE INVENTION

The present invention provides an illumination system that incorporates suitable detectors, e.g., sensors, and is driven by suitable controllers to drive integrated lighting elements, e.g. LEDs, light elements with onboard of off-board LED drivers, etc, and provide predetermined illumination, e.g., multi-zone, color, additional optics, messaging, ride-sharing indicators, ride-hail indicators, etc. There is provided an illumination system that comprises a plurality of sensors that scan/detect the exterior area around the vehicle to selectively turn on and off a series of lighting devices placed strategically around the vehicle to allow light to be directed to the ground surface at the persons feet at all times. As the user moves from one area to another in the vicinity of the vehicle, the plurality of sensors detect the location of that person and the respective lighting devices are powered on where the person is located and are powered off where the person is not located. Optionally, more than one lighting device can be on at the same time when more than one person in the predetermined vicinity of the vehicle is detected by the respective sensors. Thus, at least two lighting devices can provide illumination at the same time in the same or different zones with respect to the vehicle. The present invention provides object-tracking lighting according to an aspect of the present invention. The present invention provides follow around lighting according to an aspect of the present invention. Further aspects incorporate various applications and uses including, but not limited to, personal vehicles, ride-sharing, ride-hailing, ride indicator, theft prevention, intelligent lighting, near follow lighting, wider follow lighting, interior vehicle lighting, component lighting, alerts, hazards, beacons, security, messaging, directional lighting, identification, object identification, imaging, entertainment, communication, signaling, projection, controlled, activated, wireless, wired, detected/sensed, spot lights, areal, roadside service lighting, new mobility, flexible intelligent lighting, collaborative light paths, and etc.

BRIEF DESCRIPTION OF THE DRAWINGS

The present invention will become more fully understood from the detailed description and the accompanying drawings, wherein:

FIG. 2A is an enlarged view of lighting elements, in accordance with aspects of the present invention;

FIG. 30 is a perspective view of an light illumination system in an exemplary environment of use, according to aspects of the present invention.

DETAILED DESCRIPTION OF THE PREFERRED EMBODIMENTS

The following description of the preferred embodiment(s) is merely exemplary in nature and is in no way intended to limit the invention, its application, or uses.

Referring to FIGS. 1-30 generally, there is provided an illumination system in accordance with the present invention that comprises a plurality of detection devices that scan/detect the exterior area around the vehicle and/or interior to selectively turn on and off a series of lighting devices placed strategically around the vehicle to allow light to be directed to the ground surface generally at the person's feet at all times and/or other predetermined locations and illumination directions. The illumination system incorporates lighting to follow driver/passengers around a vehicle, according to aspects of the present invention. The illumination system incorporates signal intentions (e.g., light sequence/color to communicate door(s) opening/open, etc), according to aspects of the present invention. The illumination system incorporates communication to other vehicles/drivers/passengers/pedestrians, (e.g. ride hail/share availability, rideshare identification/indicator, cross walks, pathways, vehicle door opening alerts for cyclist, etc, according to aspects of the present invention.

Figure 1:
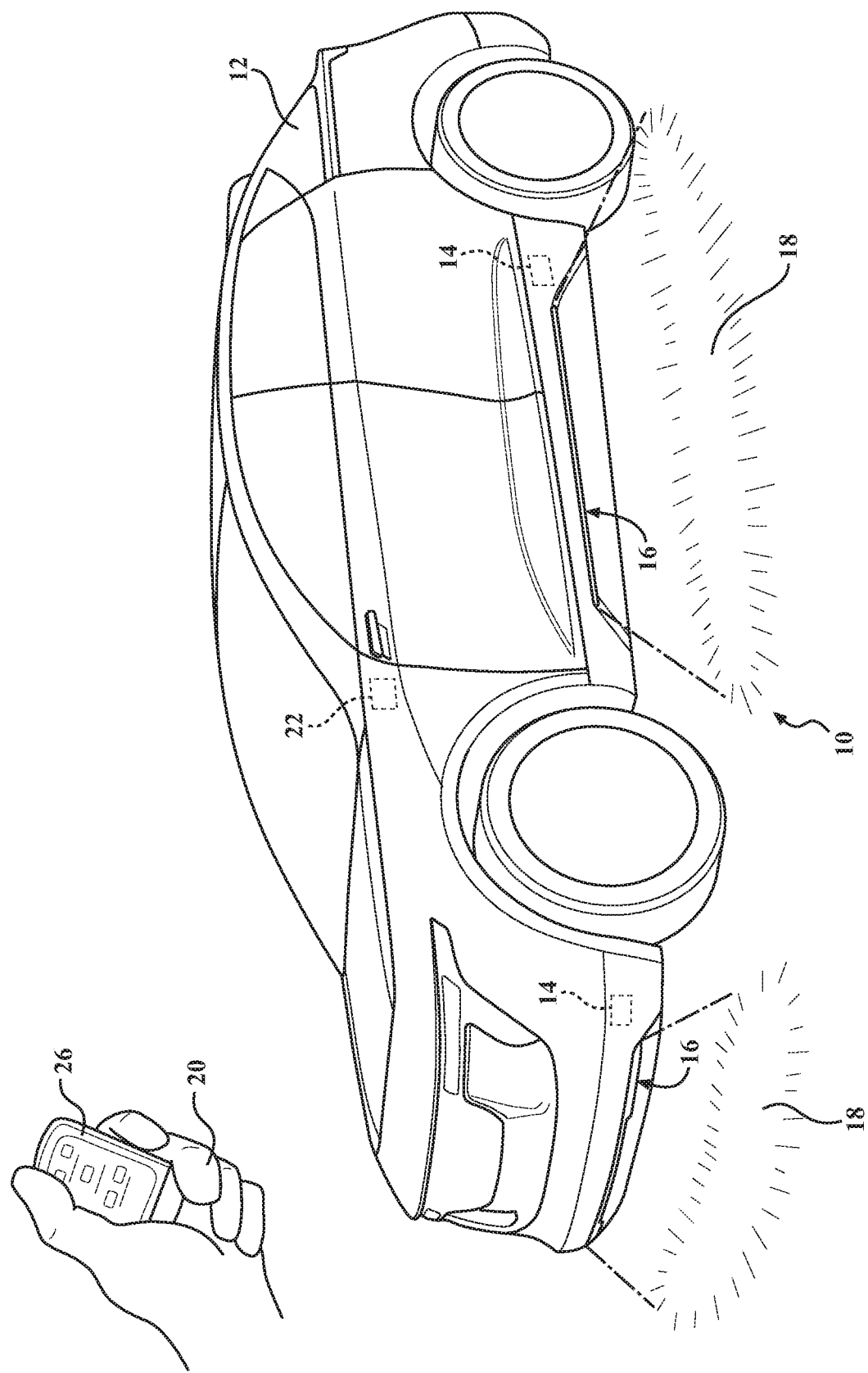
FIG. 1, is a perspective view of an illumination system on an exemplary vehicle that is fully lit, in accordance with the present invention.

Referring to FIGS. 1-29 generally, there is provided an illumination system generally shown at 10, in accordance with aspects of the present invention. The illumination system 10 is provided on a vehicle 12 (e.g., automobile, sedan, crossover, SUV, ATV, UTV, pickup, semitruck, or any other vehicle, and adoptable to be fully lit. FIG. 1 depicts exemplary fully lit illumination directed generally downward toward the ground. A plurality of detectors 14 are provided for detecting movement or proximity of a person, object, key fob, microchip, smart phone, smart watches, smart devices, computing devices or any other suitable predetermined device, such as a person approaching the vehicle 12. At first, the illumination system 10 is fully illuminated (FIG. 1), in accordance with an aspect of the present invention, such that a plurality of lighting devices, depicted generally at 16, light the respective predetermined areas 18 of the ground surface around the vehicle 12 (e.g., at least one side, both sides, front and/or rear of the vehicle and any predetermined combinations thereof). The lighting devices 16 are operably adapted to be suitable for any predetermined applications and desired lighting range, intensity, type, directed, functions, etc (e.g., flood light, spot light, follow-me light, alert, caution, locating, interfacing, vehicle location for light, direction of light, messaging, etc). Each lighting device 16 includes at least one lighting source (e.g., a light strip, etc), preferably, a plurality of lighting sources. Each lighting source includes at least one light element, preferably, a plurality of light elements (e.g., light emitting diodes, etc).

Figure 2:
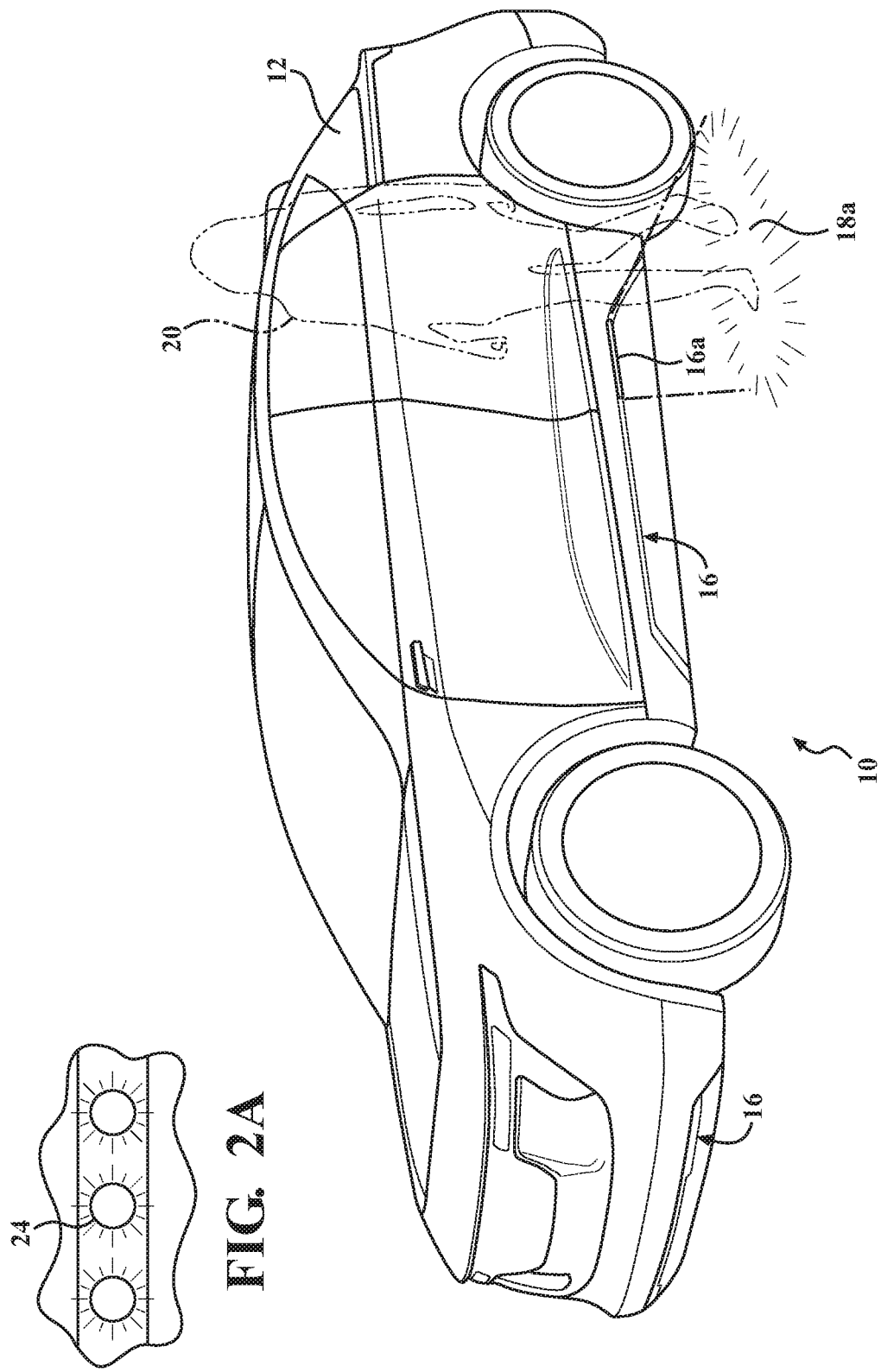
FIG. 2 is a perspective view of a vehicle with the illumination system illustrating a begin light tracking feature, in accordance with the present invention.

FIG. 2 is a perspective view of a vehicle 12 with the illumination system 10 illustrating detection of a person 20 and beginning light tracking, in accordance with the present invention. As the person 20 is detected by the respective detector 14, at least one first lighting source 16a in the vicinity of the person 20 is turned on to target light to the first area or zone 18a proximate to the person, while the rest of the illumination devices 16 are turned off (or dimmed). By way of non-limiting example, this improves visibility of the ground surface to assist the person with avoiding standing water, mud, obstacles, etc. The first lighting source 16a (e.g., located at the side of the vehicle) remains on for a predetermined period of time (e.g., about 10 to 2 seconds) or a predetermined condition changes (e.g., person moves to a new zone). By way of non-limiting example, the system 10 is preset to follow a person or a signal that a smart phone transmits.

Figure 3:
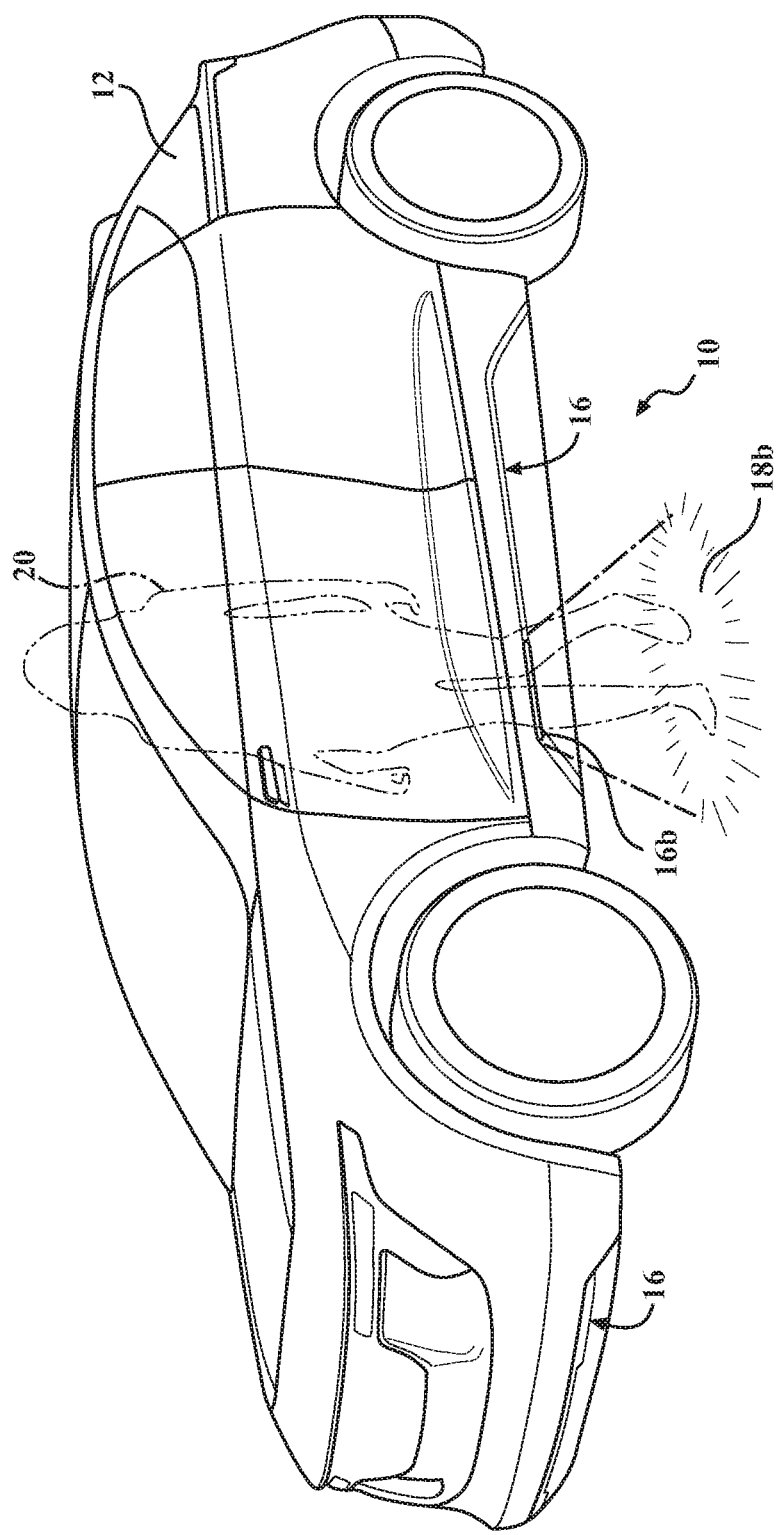
FIG. 3 is a perspective view of a vehicle with the illumination system illustrating a light following person feature, in accordance with the present invention.

FIG. 3 illustrates further tracking of the movement of the person 20 (or a device) to turn on at least one second lighting source 16b (e.g., at the side of the vehicle) that is in predetermined proximity with the moving person in a second area 18a or zone, and turn off (or alternatively dim) at least the first lighting source 16a that is not within the predetermined vicinity of the person 20. Thus, as the person 20 is moving to another location with respect to the vehicle 12, their location is operably detected by the at least one respective detection device(s) 14, and the second illumination device 16b in the vicinity of where the person 20 is now located is turned on (or brightened), while the first lighting source 16a is turned off (or dimmed) and the rest of the illumination devices 16 remain turned off (or dimmed an operable amount or changed color).

Figure 4:
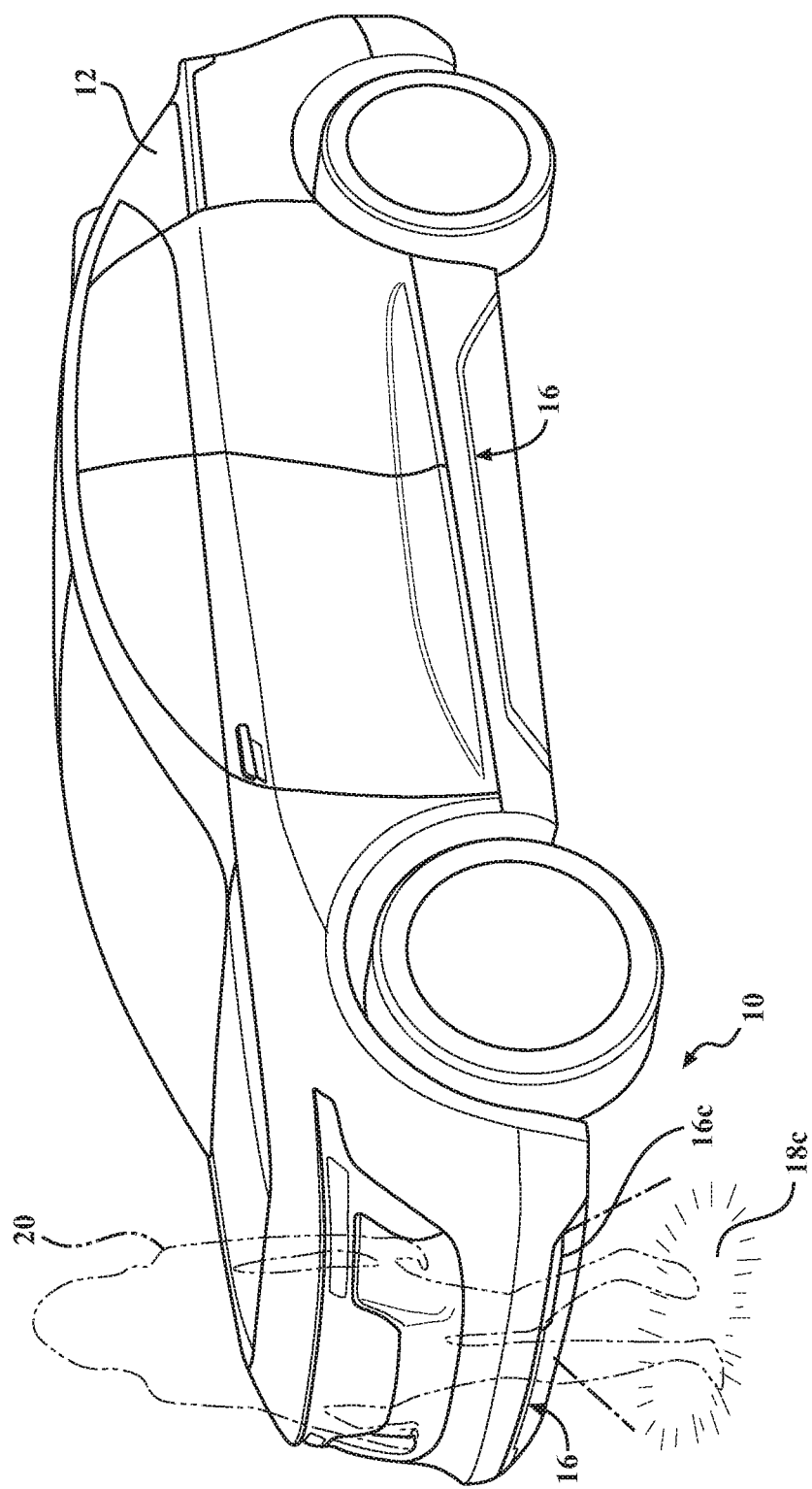
FIG. 4 is a perspective view of a vehicle with the illumination system illustrating a light following person feature, in accordance with the present invention.

FIG. 4 illustrates yet further tracking of the movement of the person 20 (or a device) to turn on at least one third lighting source 16*c* (e.g., at the front of the vehicle) that is in predetermined proximity with the moving person in a third area 18*c* or zone, and turn off (or alternatively dim) at least the second lighting source 16*b* that is not within the predetermined vicinity of the person 20. Thus, as the person 20 is moving to yet another location with respect to the vehicle 12, their location is operably detected by the at least one respective detection device(s) 14, and the third illumination device 16*c* in the vicinity of where the person 20 is now located is turned on (or brightened), while the second lighting source 16*b* is turned off (or dimmed) and the rest of the illumination devices 16 remain turned off (or dimmed an operable amount or changed color).

It is understood that this sequence can occur around the entire perimeter of the vehicle and in any order. More or less illumination devices and detectors can be provided depending on the application without departure from the scope of the present invention.

It is further understood that more than one lighting device can be on at the same time when more than one person in the predetermined vicinity of the vehicle is detected by the respective detectors. Thus, at least two lighting devices can provide illumination at the same time in the same or different zones with respect to the vehicle.

In addition, at least one predetermined controller 22 is provided that activates the ground lighting in coordination with the detector signals (e.g., sensor signals) identifying where an individual 20 or individuals are standing, sitting or walking.

Figure 8:
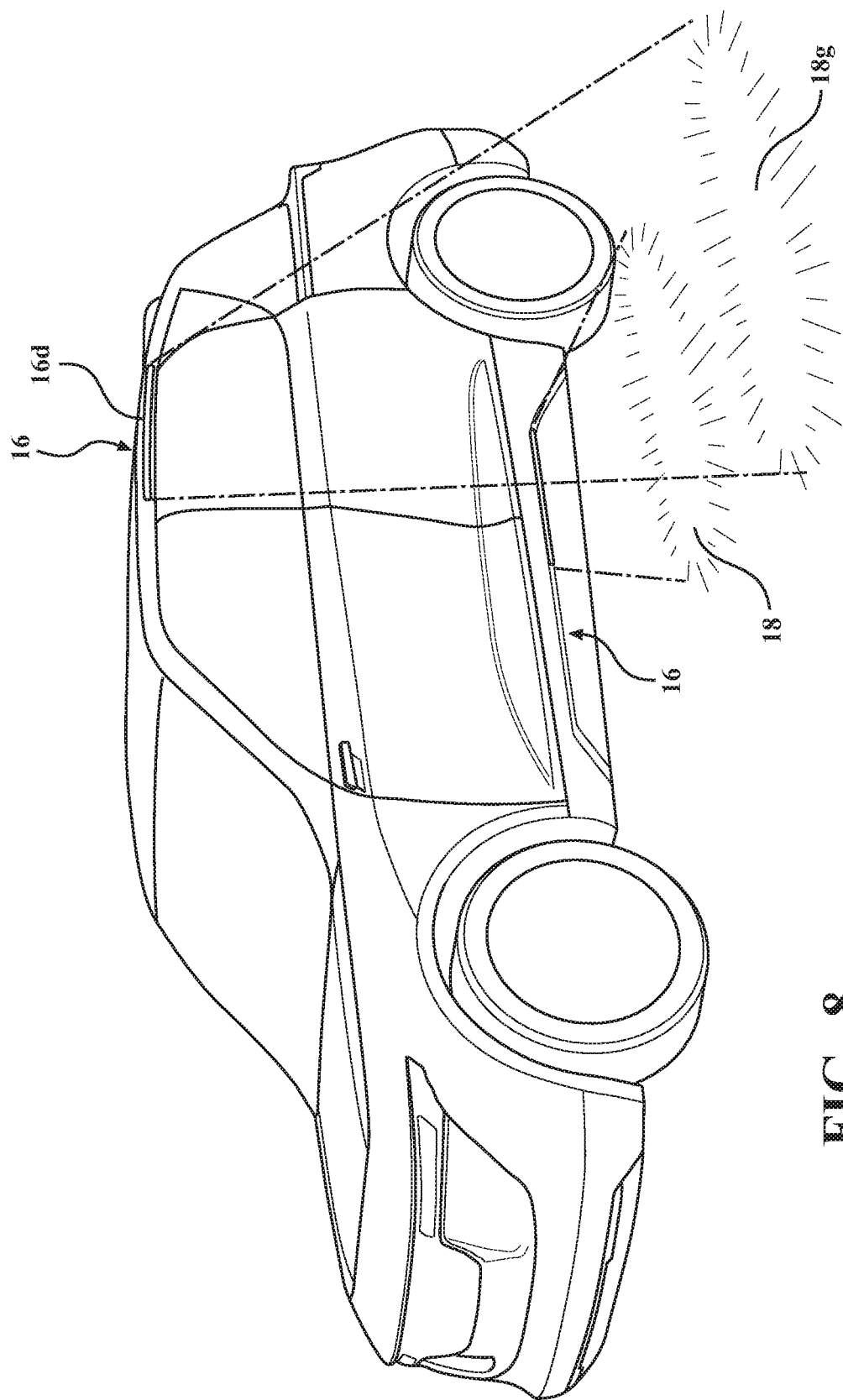
FIG. 8, is a perspective view of an illumination system on an exemplary vehicle including flood lighting, in accordance with the present invention.

Thus, when near the vehicle 12, there is provided sufficient light at all times for a person 20 to see where the person 20 is stepping (e.g., to avoid water puddles, uneven surfaces, debris, etc). Lighting devices 16 are located in at least the lower areas of the rocker panels and front and rear bumpers of the vehicle 12. The lighting devices 16 are operably positioned to provide a continuous source of light for the ground around the vehicle 12. FIG. 8 depicts the lower lighting and an additional higher position follow around lighting arrangement, which includes the at least one lighting device 16 with at least one lighting source 16*d* substantially identical but located on the roof line or other higher location on the vehicle and projecting outward/downward to direct illumination toward the predetermined ground area 18*g* further from the vehicle.

Generally, at least one of the lighting devices 16 is turned on when the person approaches the vehicle to within a predetermined distance of the vehicle 12. Typically, at least one of the lighting source(s) is/are turned on when the person approaches the vehicle to within about 10 feet of the respective lighting source. Typically, at least one of the lighting source(s) is/are turned on when the person approaches the vehicle to within about 10 feet to one foot of the respective lighting source. Preferably, at least one of the lighting source(s) is/are turned on when the person approaches the vehicle and is within about 8 feet to 1 foot of the respective lighting source. More preferably, at least one of the lighting source(s) is/are turned on when the person approaches the vehicle and is within about 5 feet to 1 foot of the respective lighting source. Most preferably, at least two of the lighting devices sources are turned on when the at least one detector 14 detects a person is within a predetermined distance of the vehicle (e.g., approaching between 10 feet to 3 feet of the vehicle), and the at least one lighting source stays on that is in proximity to the person (e.g., within about 1-2 feet) while the other(s) turn(s) off (or dims or changes color). According to aspects of the present invention, at least one lighting device 16 turns on as a person exits a vehicle (e.g., as a front door opens, or during a person's proximity while walking from the vehicle is detected and illuminates the predetermined area (e.g., ground surface to the side of the vehicle) a predetermined distance (e.g., up to about 10 feet) and/or time (e.g., about 4 to 15 seconds). It is understood that the distance can be more or less depending on the particular application without departure from the scope of the present invention.

Figure 5A:
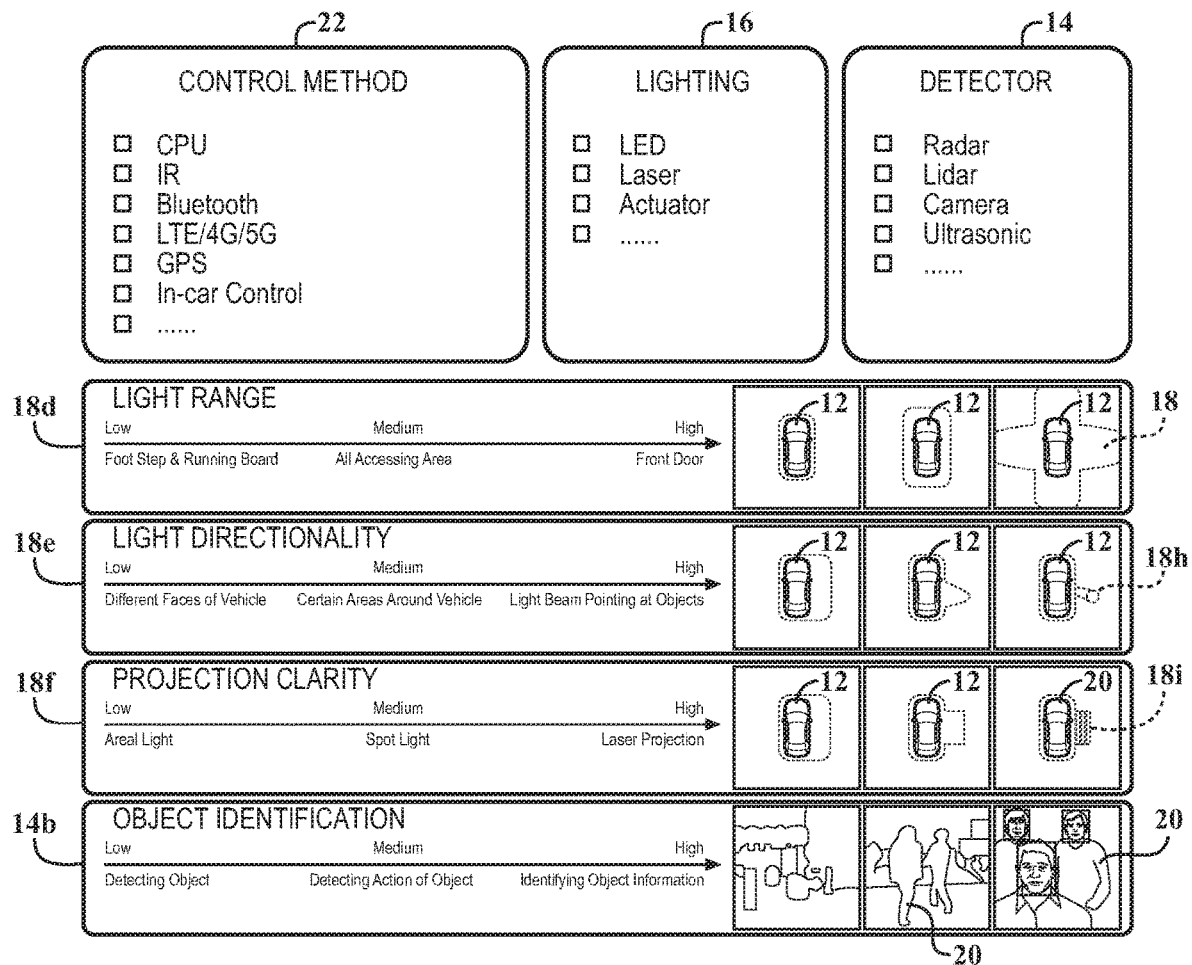
FIG. 5A is a schematic of the illumination system, according to aspects of the present invention.
Figure 5:
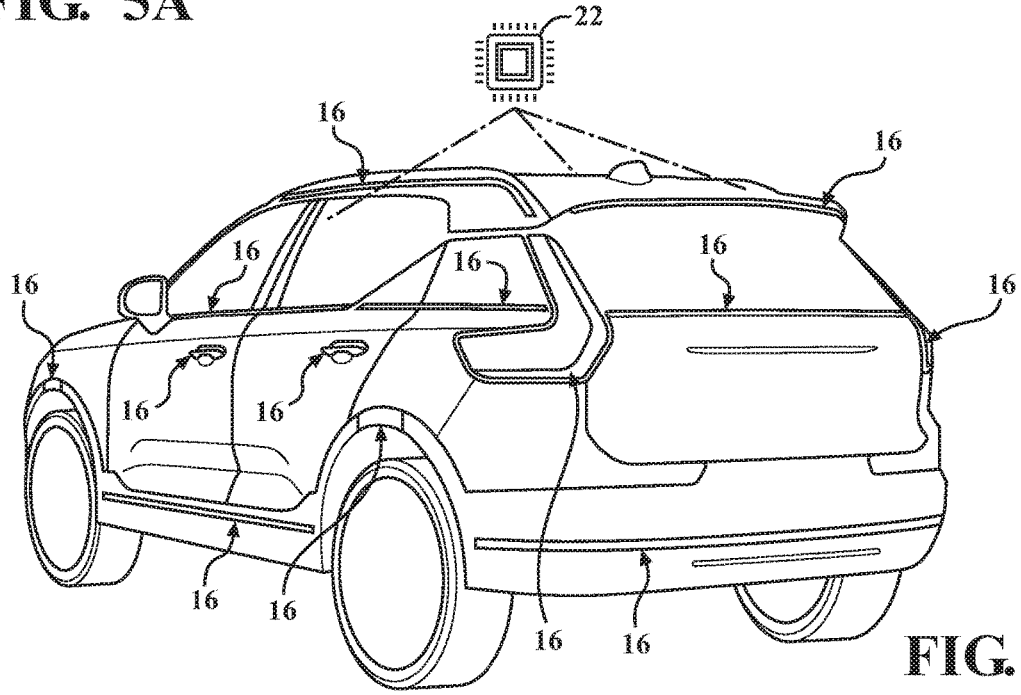
FIG. 5 is a perspective view of an illumination system depicted on the vehicle illustrating exemplary lighting devices, according to aspects of the present invention.

Thus, at least one of the lighting devices 16 is provided at a predetermined location on the vehicle. FIG. 5 depicts some further exemplary lighting device locations, including, rocker, roof line, door handles, non-metal areas, trim, quarter panel, bumper, rear lights, rear window trim, side window trim and any combinations thereof. FIG. 5 is a chart generally depicting exemplary light ranges, row 18*d*, light directionality, row 18*e*, and projection clarity 18*f*. The lower range is closer to directly adjacent to the vehicle, and as the range increases, reaching further out from the vehicle sides/front/back. The lower directionality of the light illuminates generally different broader surfaces, whereas higher directionality is a projecting spot light. The lower projection clarity is an areal light, whereas the higher projection clarity is a laser projection, e.g., such as a symbol or written message.

Figure 6:
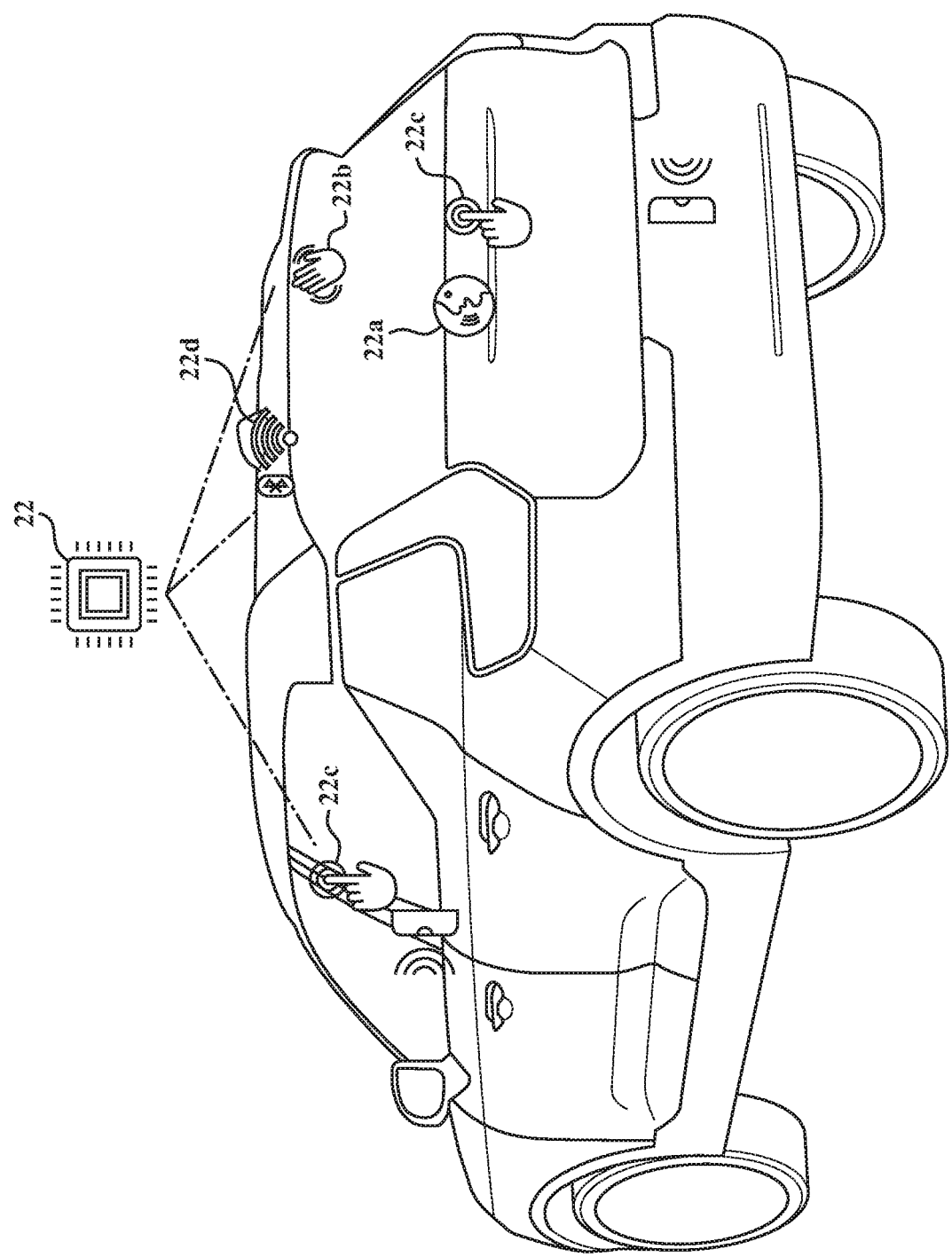
FIG. 6 is a perspective view of the illumination system depicted on the vehicle illustrating exemplary control method devices, according to aspects of the present invention.

In addition, the at least one predetermined controller 22 is provided that activates the lighting 16 in coordination with the detected signals (e.g., sensor signals). There is provided at least one controller 22 that is a predetermined controller, e.g., CPU, IR, microprocessor, Bluetooth, LTE/4G/5G, GPS, in-car control, ECU, UDX vehicle communications, or any other suitable control and any combinations thereof. FIG. 6 depicts some exemplary controls and communication including voice activation 22*a*, motion 22*b*, touch 22*c*, signals and wireless 22*d*.

Each lighting devices 16 includes at least one light element 24 (e.g., LED) with onboard or off board drivers (e.g., LED drivers), preferably, each with a plurality of light elements 24. The light elements 24 are controlled in 1-1000s of individual zones. These zones are controlled through matrix drivers onboard or near the LEDs. There is at least one predetermined archetectural control. By way of non-limiting example, an electrical architecture, e.g., digital with a digital signal and power which enables about a 3-4 wire connection to control any number of zones. Alternatively, there is wireless connectivity and wireless power or energy harvesting with at least one battery or capacitor to enable a no-wire connectivity. In addition, micro and software may reside in a unique controller, or with a shared function on an existing ECU for doors, body, lights, sensors, domain controller, etc.

According to aspects of the present invention, the lighting system 10 is a discrete lighting module. In accordance with aspects of the present invention, the lighting system 10 is a compact, self-contained element that is bonded or overmolded into a component, e.g., a molding.

The Light elements 24 may be individual LEDs, Flecsform micro LED, micro LEDs, mini LEDs, flecsform printed with micro and mini LEDs, organic light-emitting diode (OLED), micro LEDs 100-1000s on a circuit, or any other suitable lighting element and any combinations thereof. The light elements 24 may be single or multi zone, up to the thousands. The light elements 24 are white, amber, any color(s), or red/blue/green (RGB LED) to cover a full or partial palatte, flashing, strobing, changing color, pattern, etc. The light elements 24 can incorporate additional optics for diffusion or focus or special appearance (emblems, graphics, characters, words, symbols, diffuse, metallic, metalized, thin optical element, opaque, transparent, translucent, frosted, etc). The light elements 24 may be integrated with a discrete light module, or embedded/molded/bonded into other exterior components, e.g., vehicle trim.

The plurality of detectors 14 are provided for detecting movement or proximity of a person, object, key fob 26, microchip, smart phone, smart watches, smart devices, computing devices or any other suitable predetermined device and combinations, such as a person approaching the vehicle 12. In accordance with aspects of the present invention the present invention provides object/person detection from vehicle sensors and is integrated with other predetermined devices, e.g., watches, smart phones, built in communication devices, etc, to enable control of lighting in and/or around the vehicle.

Figure 7:
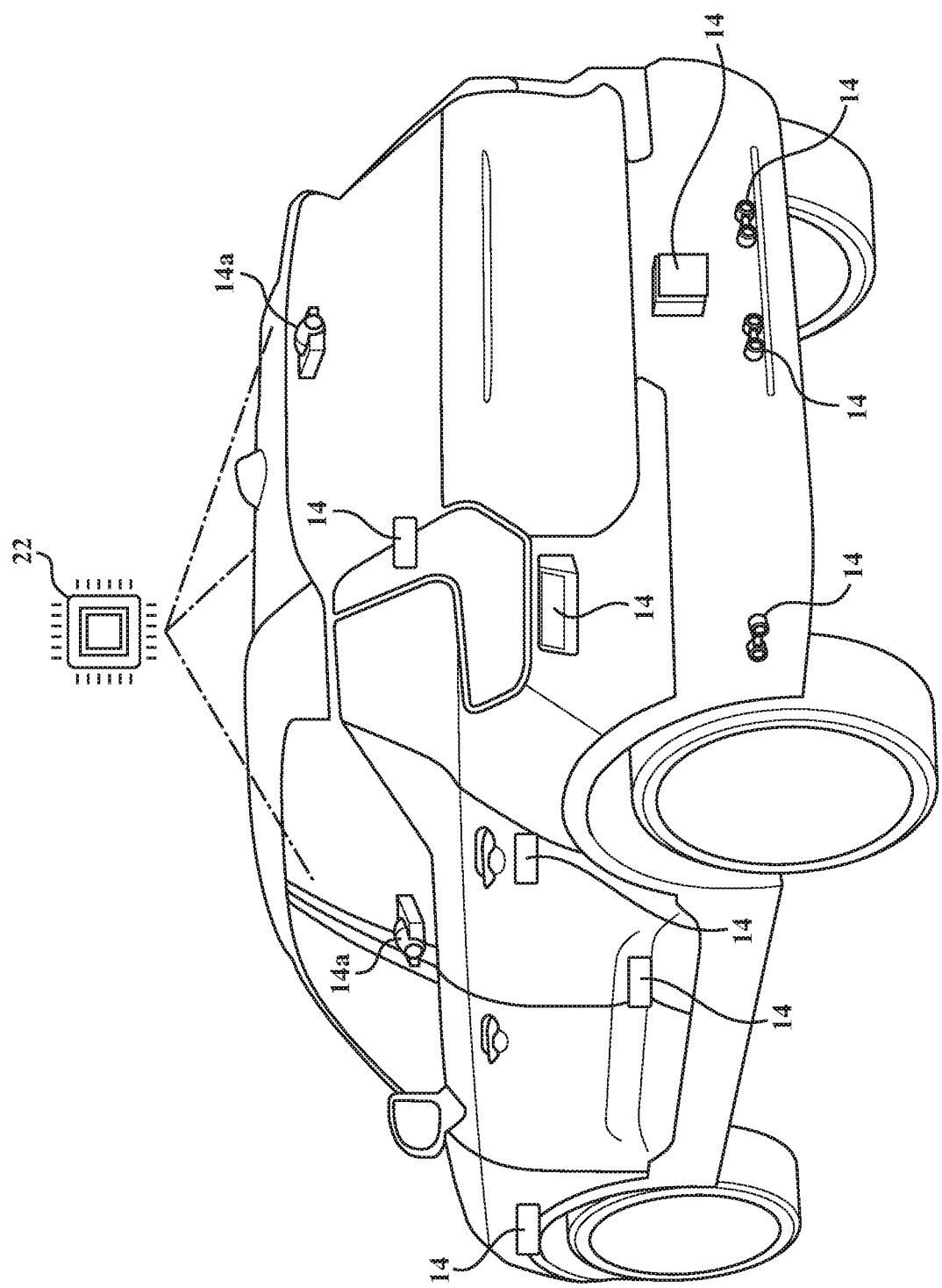
FIG. 7 is a perspective view of the illumination system depicted on the vehicle illustrating exemplary detectors, according to aspects of the present invention.

FIG. 7 illustrates some further exemplary detector 14 locations. In accordance with aspects of the present invention, at least one detector 14 is used in at least one predetermined location, preferably, a plurality of detectors 14 at predetermined locations, depending on the particular applications (e.g., vehicle interior, mirror(s), door(s), door opening(s), door(s), headliner, seat, console, center console, interior trim, vehicle exterior, lights, trim rocker panel, mirrors/pod, liftgate, tailgate, roof rack/module, fascia, mounted to body, overhead on a liftgate, doors, door handle (s), pillars, molding, trim, headlights, taillights, license plate, body panels, bumpers, windshield, windows, quarter panels, wheel wells, inward facing cameras, etc and any combinations thereof. FIG. 5A is a chart generally depicting exemplary object identification, row 14b. The lower range generally detects an object, e.g., that an object is present, and as the identification intensity increases, the motion of the object is detected; whereas at the highest range, more specific object identification is obtained, e.g., facial recognition.

The detectors 14 are sensors, radar, lidar, camera, ultrasonic, capacitive seat sensor, non-contact obstacle/people detection devices, optical, infrared, magnetic, switches, capacitive, sensor device apparatus (wired or not wired) that senses pedestrians, mobile device communication (incorporating BLE-blue tooth low energy or other NFC-near field communication, etc to connect to devices wirelessly), or any other suitable detector, depending on the particular applications.

It is understood that a predetermined amount of detectors 14 are used and in any combination and in predetermined locations depending on the particular applications without departure from the scope of the present invention. By way of non-limiting example, at least one camera 14a (see also FIG. 12) that is rear facing, and at least one sensor on each side of the vehicle.

In a particularly preferred aspect of the present invention, the detectors 14 are sensors that are regional such that a few are located throughout the vehicle. According to a further aspect of the present invention, the lighting system 10 is self-contained and lightweight with discrete components in wireless communication with, or with few connectors to, sensors or other detectors, that are regional throughout the vehicle. By way of non-limiting example, a belt-molding light that is a thin, flexible strip with pressure sensitive adhesive incorporating power source (e.g, solar), at least one sensor and that wirelessly connects to a controller, which is a peel and stick application to the vehicle. By way of another non-limiting example, a power actuated liftgate that incorporates lighting, and the illumination device 16 operably plugs locally into existing wire harness for the liftgate lighting.

Figure 9:
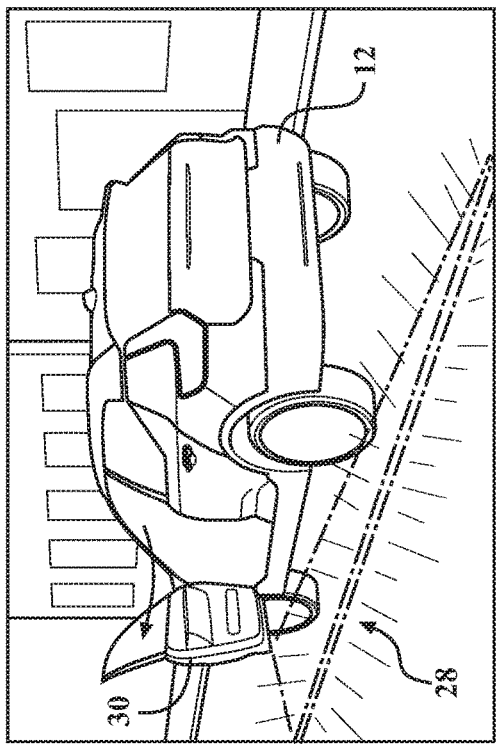
FIG. 9, is a perspective view of an illumination system on an exemplary vehicle including an open door safety line, in accordance with the present invention.

FIG. 9 depicts the illumination system 10 including an area of illumination 18 emitted from at least one lighting device 16, similarly structured as described previously and incorporated here, which is an open door safety indication safety line indicated generally at 28, located a predetermined distance from the vehicle and is a predetermined length, and turns on when a door 30 is open. This provides the significant advantage to cyclists of clearly depicting an open-door condition to avoid a collision. By way of non-limiting example, a sensor, proximity switch, handle sensor etc drives a door ajar signal to illuminate the respective lighting device's 16 light elements 24 to form the safety line 28 of light.

Figure 10:
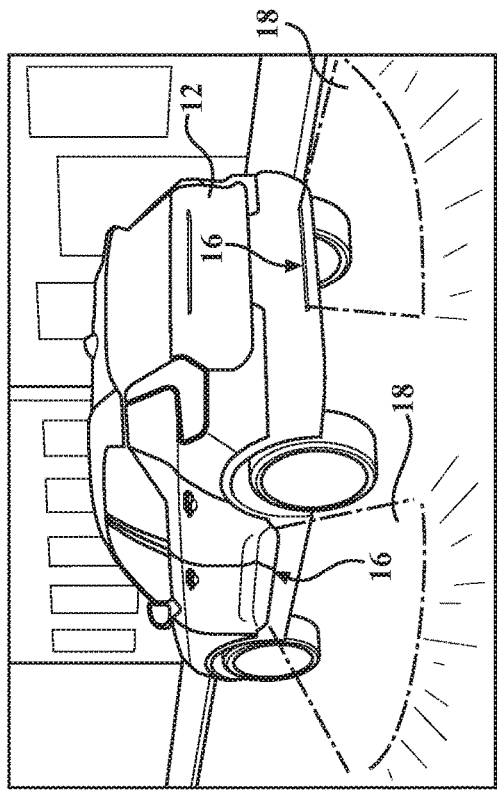
FIG. 10, is a perspective view of an illumination system on an exemplary vehicle including alert lighting, in accordance with the present invention.

FIG. 10 depicts the illumination system 10 including a plurality of illumination areas 18 emitted from at least one lighting device 16, similarly structured as described previously and incorporated here, which are alert/caution lighting (e.g., amber lighting), generally directed toward the ground surface in at least one direction.

Figure 11:
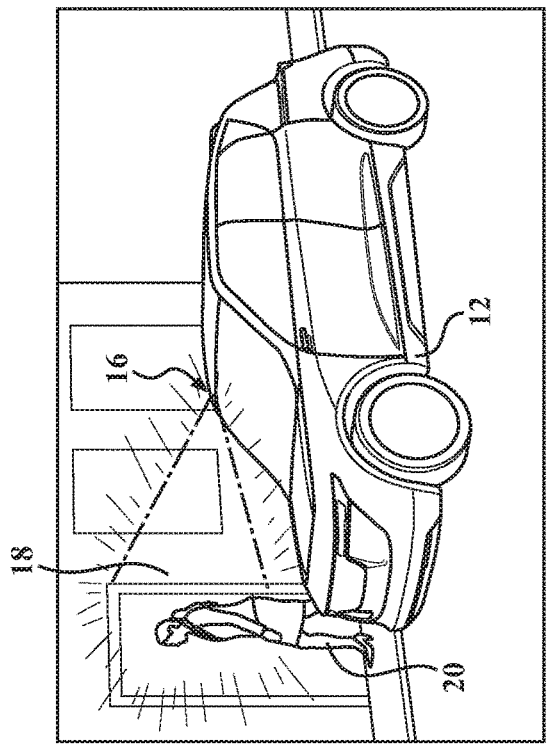
FIG. 11, is a perspective view of an illumination system on an exemplary vehicle including follow-me lighting, in accordance with the present invention.

FIG. 11 depicts the illumination system 10 including at least one following light that illuminates a broader area 18, which is emitted from at least one lighting device 16 similar to as described previously and incorporated here and adapted for the particular application to provide a following light. In particular, a further light range 18, such as to follow a person from the vehicle to their front door of their home. Another non-limiting example is a further light range for a personal ride share vehicle.

Figure 12:
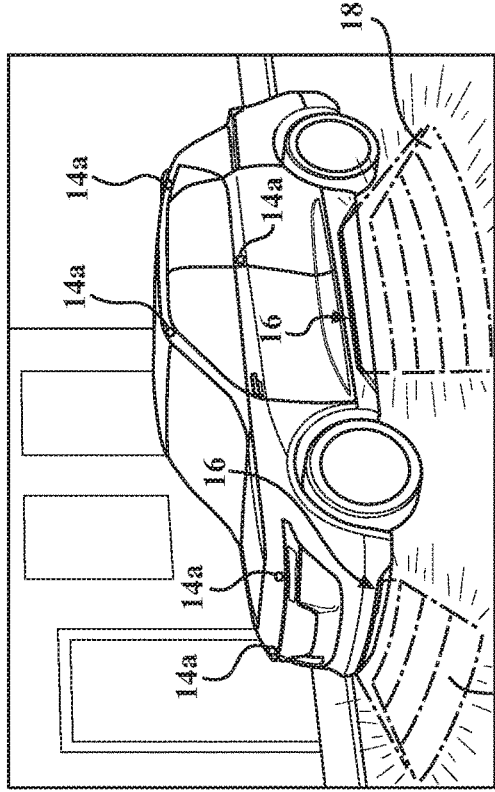
FIG. 12, is a perspective view of an illumination system on an exemplary vehicle including security lighting, in accordance with the present invention.

FIG. 12 depicts the illumination system 10 including at least one security mode including a plurality of cameras 14a (e.g., with a recording option), and a plurality of illumination areas 18 generally directed toward the ground surface in at least one direction, which illumination area 18 is emitted from at least one lighting device 16 similar to as described previously and incorporated here.

Figure 13:
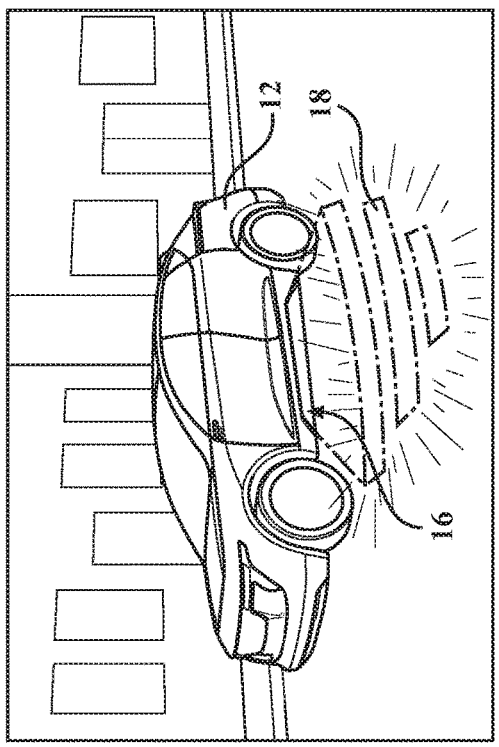
FIG. 13, is a perspective view of an illumination system on an exemplary vehicle including welcome lighting, in accordance with the present invention.

FIG. 13 depicts the illumination system 10 including at least one welcome light path illuminating area 18, which is emitted from at least one lighting device 16 similar to as described previously and incorporated here and adapted for the particular application to provide a welcome light path (e.g., welcome sequence, welcoming light path, welcome "red carpet" to the vehicle door(s), etc).

Figure 14:
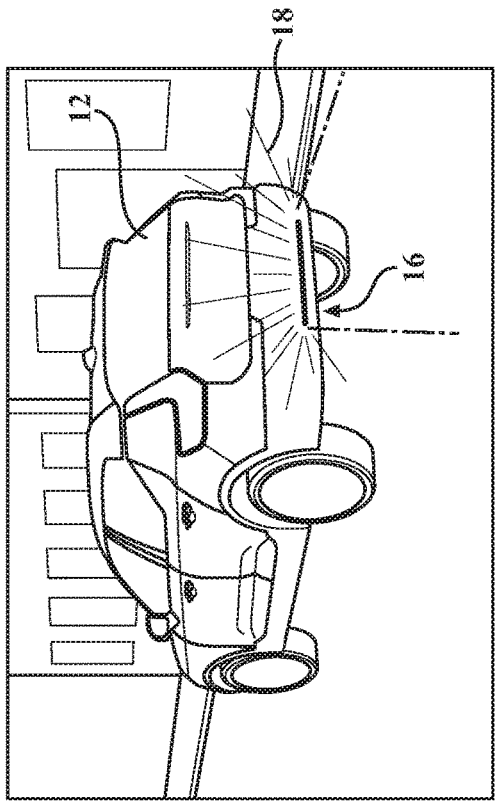
FIG. 14, is a perspective view of an illumination system on an exemplary vehicle including reverse lighting, in accordance with the present invention.

FIG. 14 depicts the illumination system 10 including at least one reverse light illuminating area 18, which is emitted from at least one lighting device 16 similar to as described previously and incorporated here and adapted for the particular application to provide a reversing alert. The reverse light elements 24 project a very bright reverse light 16 when the vehicle 12 is to go in reverse that improves visibility.

Figure 15:
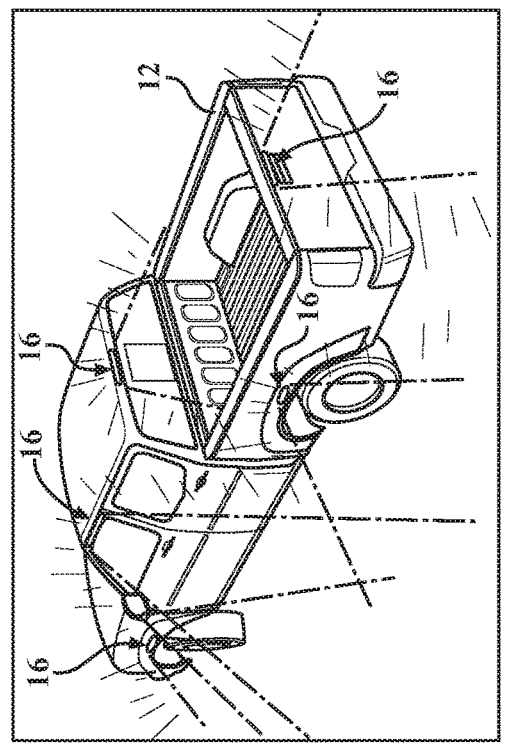
FIG. 15, is a perspective view of an illumination system on an exemplary vehicle including blind spot lighting, in accordance with the present invention.

FIG. 15 depicts the illumination system 10 including at least one blind spot illuminating area 18, which is emitted from at least one lighting device 16 similar to as described previously and incorporated here and adapted for the particular application to selectively provide lighting of a plurality of blind spots to improve visibility. By way of non-limiting example, the lighting devices 16 are provided on the trim of the vehicle 12.

Figure 16:
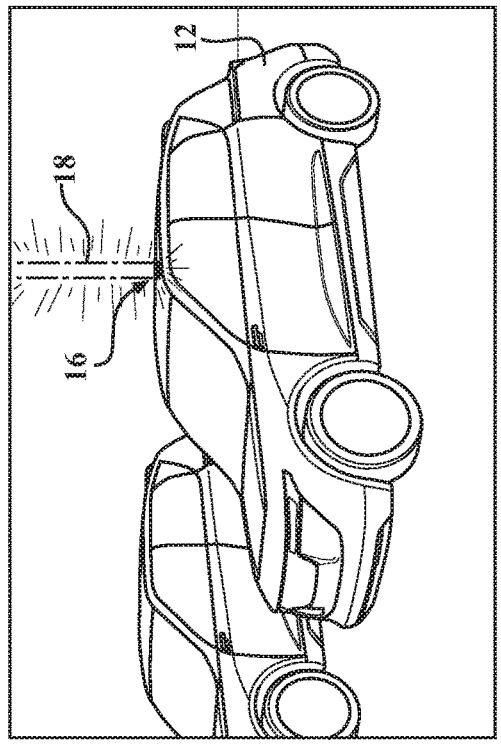
FIG. 16, is a perspective view of an illumination system on an exemplary vehicle including beacon lighting, in accordance with the present invention.

FIG. 16 depicts the illumination system 10 including at least one visible beam illuminating area 18, which is emitted from at least one lighting device 16 similar to as described previously and incorporated here and adapted for the particular application to selectively provide a beam of light visible from a greater distance. A particularly advantageous aspect of the present invention is a light beam, e.g., laser light beam, projecting substantially upward from the vehicle 12 that is a laser beam beacon to help a person 20 find the vehicle 12 in a parking lot.

Figure 17:
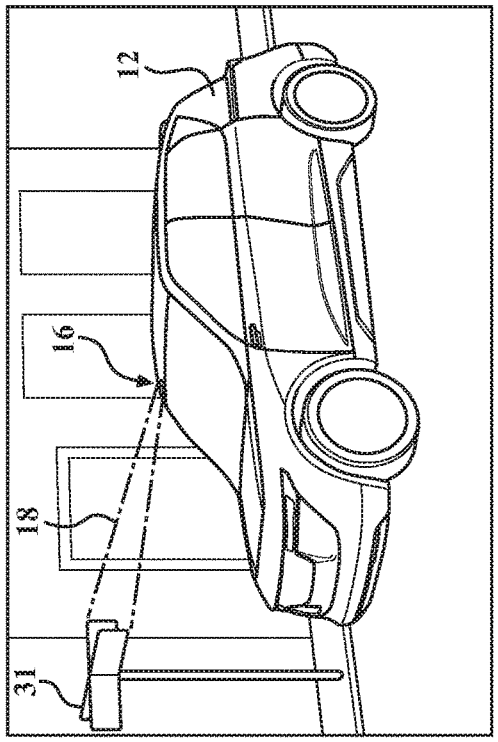
FIG. 17, is a perspective view of an illumination system on an exemplary vehicle including virtual address lighting, in accordance with the present invention.

FIG. 17 depicts the illumination system 10 including at least one projected illumination area 18, which is emitted from at least one lighting device 16 similar to as described previously and incorporated here and adapted for the particular application to provide a projected image. By way of non-limiting example, an address (e.g., number) is projected. The system can operably ping a street sign 31 for example and show an address. Preferably, the projection is a driving direction/door number or any other desired information depending on the particular application. By way of non-limiting example, the projection is of an address to assist drivers, rideshare drivers/providers, delivery drivers, first responders, etc looking for a particular home or business based on the address.

Figure 18:
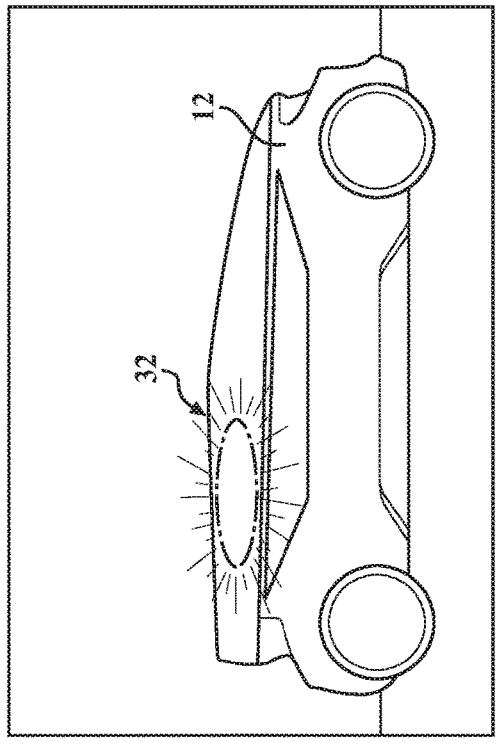
FIG. 18, is a perspective view of an illumination system on an exemplary vehicle including vehicle messaging lighting, in accordance with the present invention.

FIG. 18 depicts the illumination system 10 including at least one projected illumination area 18, which is emitted from at least one lighting device 16 similar to as described previously and incorporated here and operably adapted for the particular application to provide at least one message indicated generally at 32, e.g., a shoulder line height message on the side trim/panel or side window of the vehicle 12. By way of non-limiting example, a rideshare message.

Figure 19:
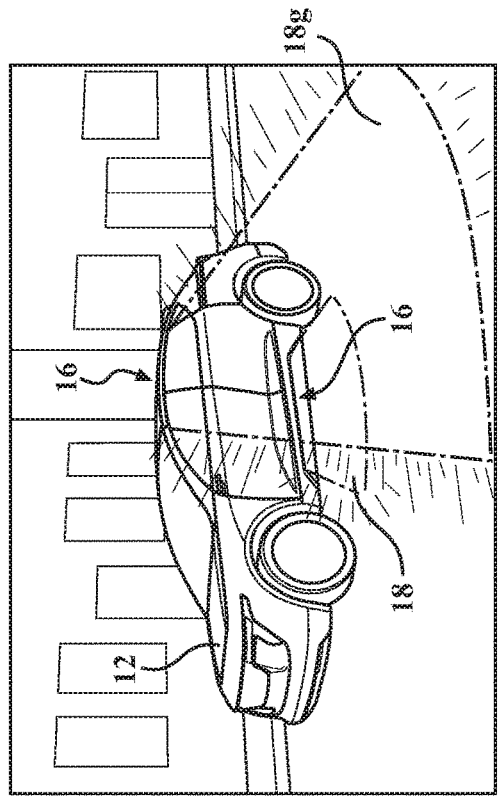
FIG. 19, is a perspective view of an illumination system on an exemplary vehicle including message projection lighting, in accordance with the present invention.

FIG. 19 depicts the illumination system 10 including at least one further range projected illumination area 18, which is emitted from at least one lighting device 16 similar to as described previously and incorporated here and operably adapted for the particular application to provide at least one flood light region generally indicated at 18g, e.g., generally projected downward out further from the vehicle 12. The at least one lighting device 16 is a high position projection light that has a greater lighting range and projects further, e.g., more than at least about 10 feet. By way of non-limiting examples, the projected area selectively provides flood lighting, rideshare messages, or projected address number, etc and any combinations thereof. Additionally, the system 10 including at least one illumination area 18 to light the footpath by the vehicle doors, which is emitted from at least one lighting device 16 that is a lower range light device (e.g., integrated with the rocker panel, side step, etc) similar to as described previously and incorporated here.

Figure 20:
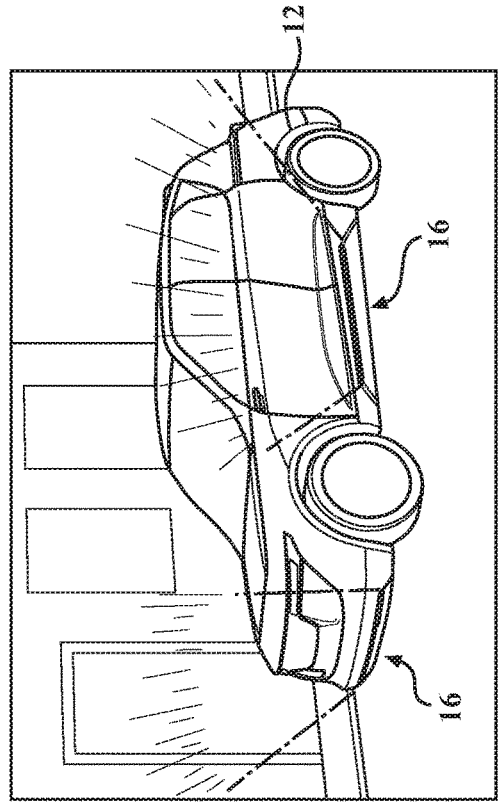
FIG. 20, is a perspective view of an illumination system on an exemplary vehicle including entertainment lighting, in accordance with the present invention.

FIG. 20 depicts the illumination system 10 including at least one entertainment lighting illumination area 18, which is emitted from at least one lighting device 16 similar to as described previously and incorporated here and operably adapted for the particular application to provide entertainment lighting effects, e.g., a plurality of light devices 16 targeting light generally upward for entertainment or outward to display light, images, messages, etc on a surface such as a garage, side of a building, wall, projection screen, boulders, etc.

Figure 21:
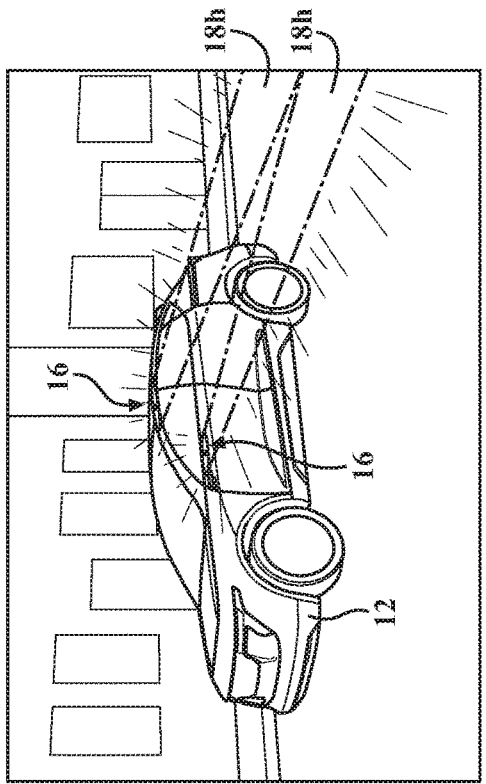
FIG. 21, is a perspective view of an illumination system on an exemplary vehicle incorporating software updates, in accordance with the present invention.

FIG. 21 depicts the illumination system 10 incorporating predetermined infrastructure and devices for software updates for lighting effects. A predetermined software upload element 34 is provide in predetermined locations, e.g., in a building, that is tied into all autonomous sensors of the vehicle 12 and operable to provide downloadable updates. By way of non-limiting example, all vehicles are networked for updates. Cloud implementation is yet another example.

Figure 22:
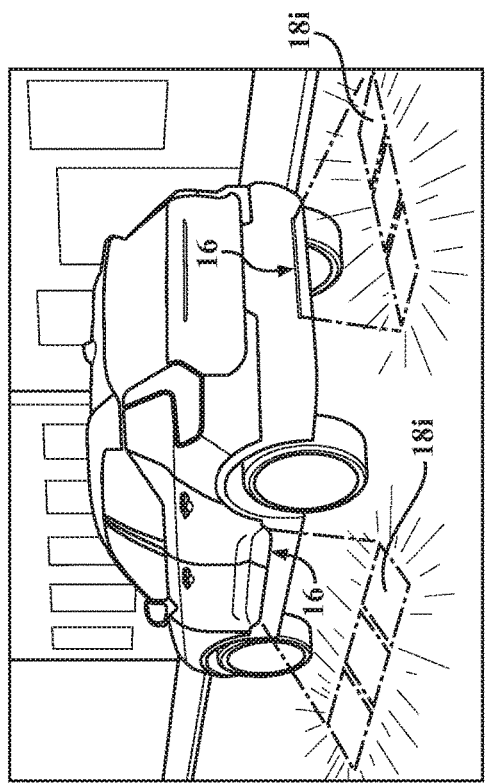
FIG. 22, is a perspective view of an illumination system on an exemplary vehicle including object pointer lighting, in accordance with the present invention.

FIG. 22 depicts the illumination system 10 including at least one spot light illumination area 18, which is emitted from at least one lighting device 16 similar to as described previously and incorporated here and operably adapted for the particular application to provide at least one light focused spotlight 18h, rather than a flood light. The light, e.g., from each spotlight 18h,18h, focuses on a respective point or condensed area. The system provides object/pointer/animal indicator compatibility.

Figure 23:
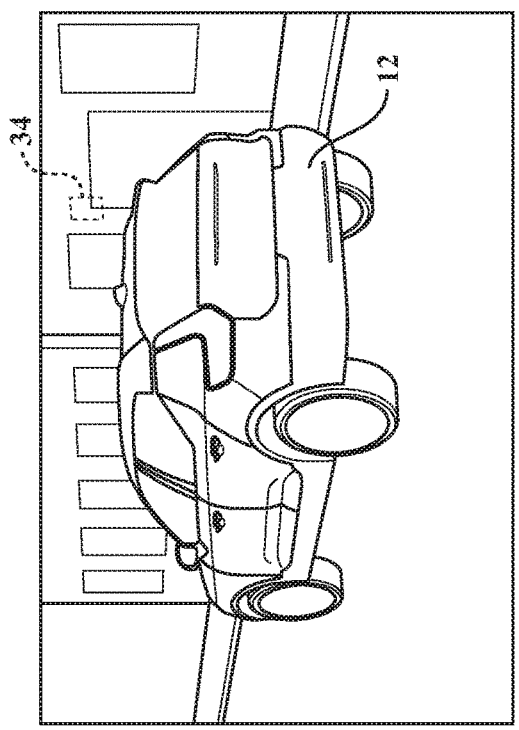
FIG. 23, is a perspective view of an illumination system on an exemplary vehicle including door handle lighting, in accordance with the present invention.

FIG. 23 depicts the illumination system 10 including at least one lighting device 16 operably connected to or integrated formed with an exterior vehicle door handle.

Figure 24:
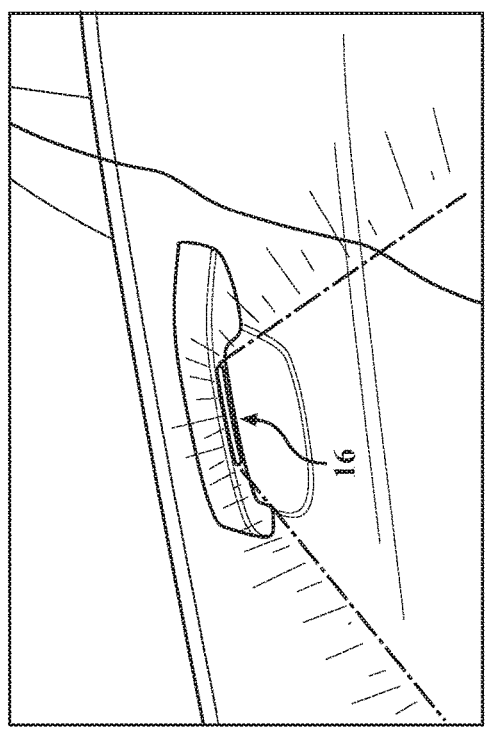
FIG. 24, is a perspective view of an illumination system on an exemplary vehicle including interface projection lighting, in accordance with the present invention.

FIG. 24 depicts the illumination system 10 including at least one projected illumination area, which is emitted from at least one lighting device 16 similar to as described previously and incorporated here and operably adapted for the particular application to provide at least one projected interface indicated generally at 18i, e.g., a projected image or message generally downward at an angle in a ground surface direction. By way of non-limiting examples, the projected interface 18i selectively provides rideshare messages, projected address number, images, words, symbols etc and any combinations thereof. By way of further non-limiting example, the lighting operably communicates that this is your hailed or otherwise requested ride that is arriving.

Figure 25:
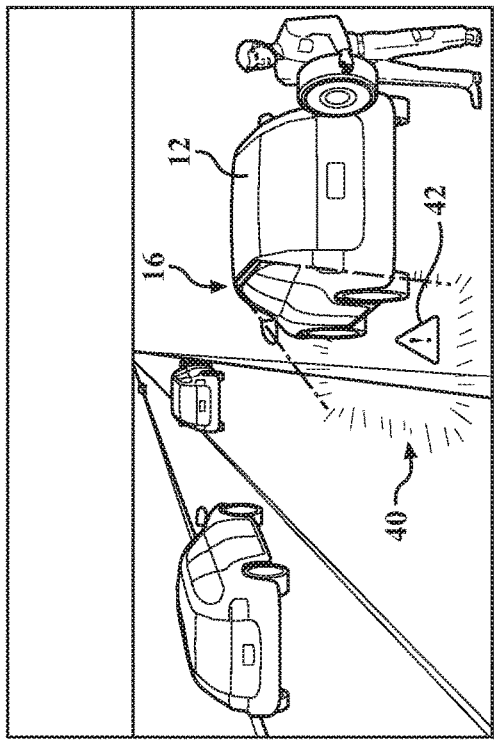
FIG. 25, is a perspective view of an illumination system on an exemplary vehicle including roadside lighting, in accordance with the present invention.

FIG. 25 depicts the illumination system 10 including at least one illumination area, which is emitted from at least one lighting device 16 similar to as described previously and incorporated here and operably adapted for the particular application to provide at least one safe zone lighting region indicated generally at 40, e.g., flood light, roadside assistance and safety lighting, a projected caution symbol 42, message or safety line 28 generally in at least a ground surface direction and any combinations thereof.

Figure 26:
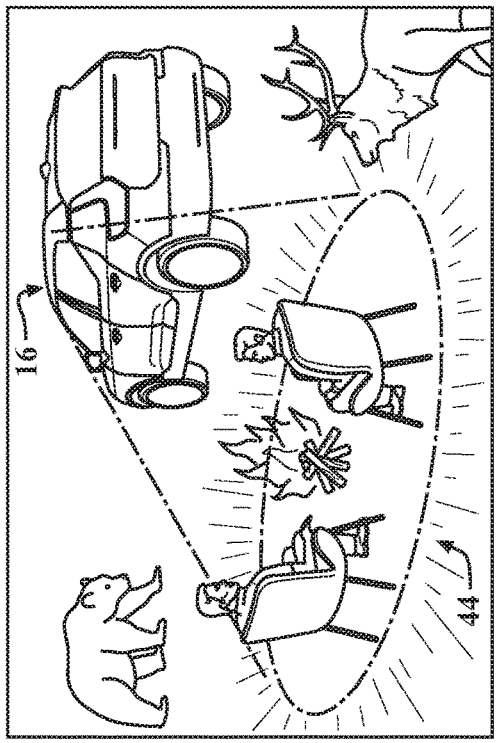
FIG. 26, is a perspective view of an illumination system on an exemplary vehicle including outdoor intelligent lighting, in accordance with the present invention.

FIG. 26 depicts the illumination system 10 including at least one illumination area, which is emitted from at least one lighting device 16 similar to as described previously and incorporated here and operably adapted for the particular application to provide at least one outdoor intelligent lighting 44, e.g., to where people are located, surrounding the vehicle, or any other predetermined location(s).

Figure 27:
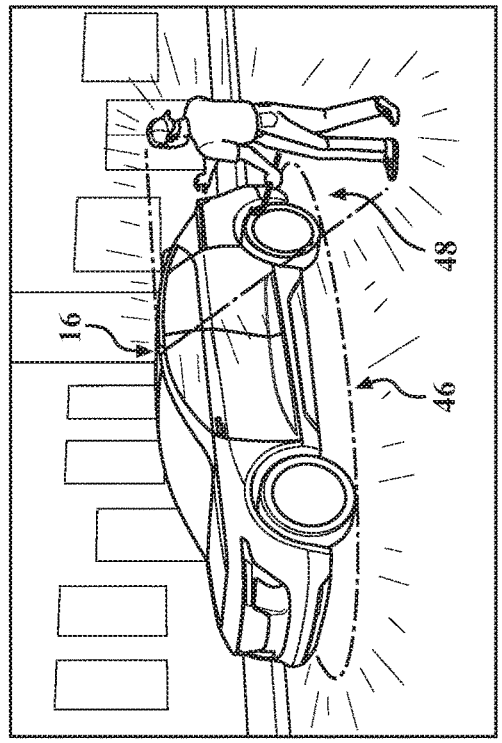
FIG. 27, is a perspective view of an illumination system on an exemplary vehicle including theft prevention lighting, in accordance with the present invention.

FIG. 27 depicts the illumination system 10 including at least one illumination area, which is emitted from at least one lighting device 16 similar to as described previously and incorporated here and operably adapted for the particular application to provide theft prevention lighting, e.g., in a direction generally toward proximity 48 to a detected person 20, follow-me light, light surrounding the vehicle 46, or any other predetermined location(s) and combinations thereof.

Figure 28:
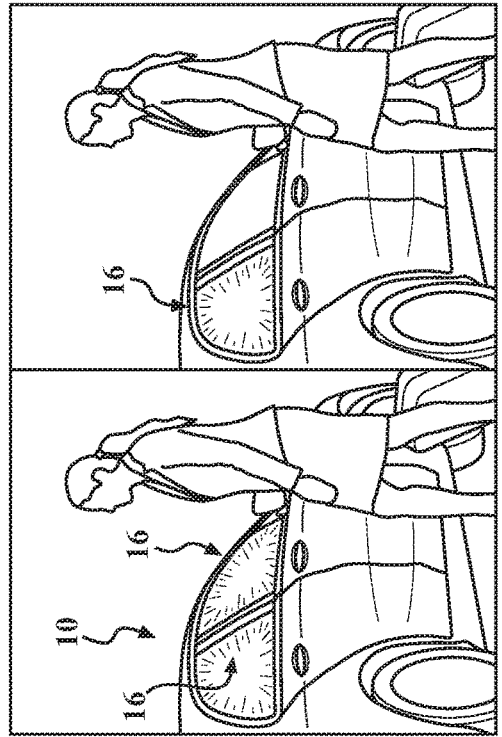
FIG. 28 is a perspective view of an illumination system on an exemplary vehicle including ride indicator lighting, in accordance with the present invention.

FIG. 28 depicts the illumination system 10 including at least one illumination area, which is emitted from at least one lighting device 16 similar to as described previously and incorporated here and operably adapted for the particular application to provide a seat indicator. By way of non-limiting example, at least one ride-share vehicle window is operably illuminated by the lighting device 16 when a predetermined passenger in proximity is detected by the at least one detector 14. The available seat, e.g., front passenger or rear seats can illuminate with availability, by way of further non-limiting example. By way of non-limiting example, the lighting operably communicates that this is your ride arriving. By way of another non-limiting example, the system 10 allows ride-sharing and/or autonomy (e.g., ride-hailing) proximity lighting.

Figure 29:
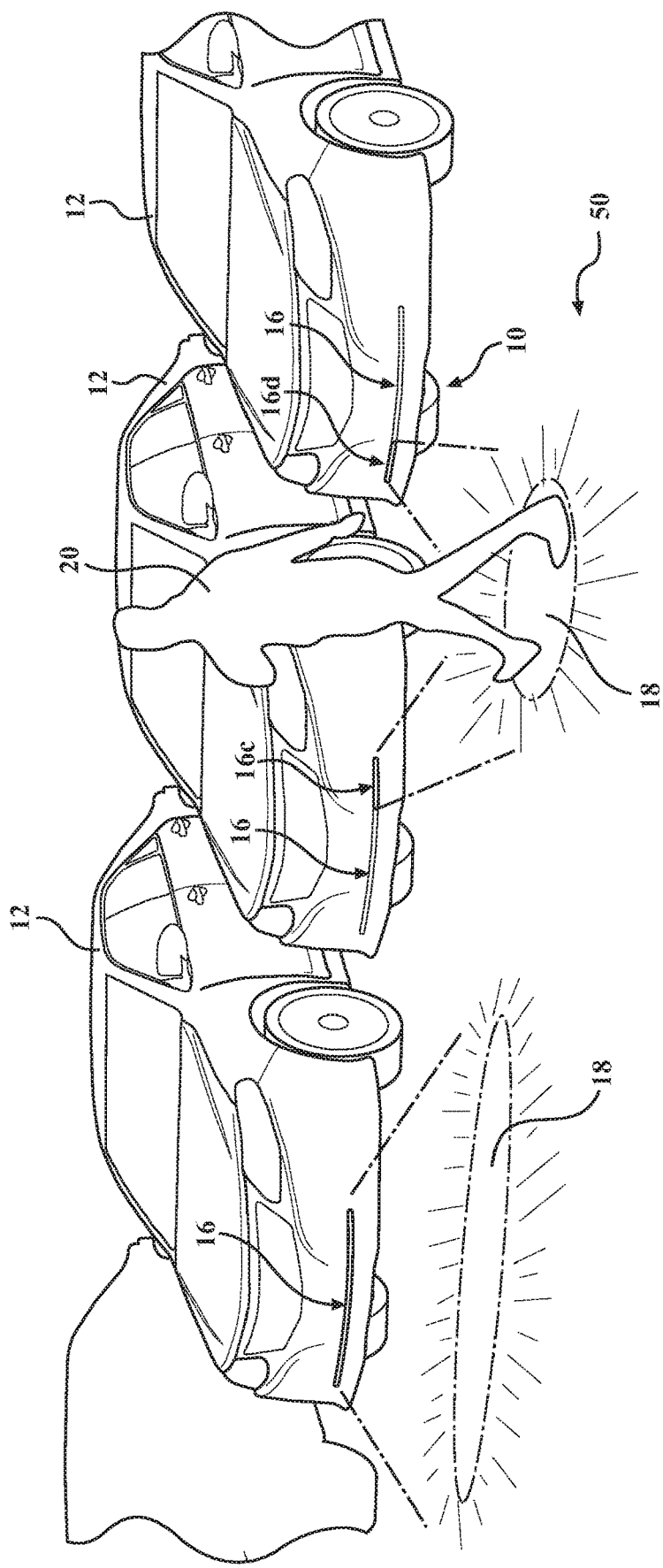
FIG. 29 is a perspective view of an light illumination system in an exemplary environment of use, according to aspects of the present invention.

FIG. 29 depicts the illumination system 10 including at least one illumination area 18, which is selectively emitted from at least one lighting device 16 on each of a plurality of vehicles 12 in a parking lot (e.g., a rideshare fleet, rental vehicle lot, autonomous vehicles, fleets and urban environments and communications, etc) similar to as described previously and incorporated here and operably adapted for the particular application to provide a selectively lit pathway and/or vehicle identification lighting. By way of non-limiting example, a fleet of vehicles include follow-me lighting to light the path of a person 20 walking down the row 50 of cars. By way of further non-limiting example, a fleet of vehicles include welcome lighting or other predetermined illumination(s) when a person 20 is in proximity to their pre-assigned vehicle (a rental vehicle) to alert the person 20 to the vehicle (e.g., lighting change in intensity, color, location, etc and any combinations thereof. By way of another non-limiting example, the lighting 10 provides a community element, such as rental fleet vehicles or a fleet of vehicles owned by a business are programmed to provide a person with lighting and a person's 20 particular vehicle for use alerts.

FIG. 30 depicts an illumination system 110 in accordance with aspects of the present invention that includes at least one illumination area 118, which is selectively emitted from at least one lighting device 116 on a surface 112 when detected 114 in predetermined proximity to a person 20. By way of non-limiting example, lighting is turned on/off along a pathway 112 (e.g., steps, stairway, street, parking lot, sidewalks, side of buildings, subway platform, etc). The lighting devices 116 are ground surface, overhead, lamp or any other height and combinations thereof. By way of non-limiting example, follow-along lamps are set at a predetermined sensitivity with respect to a person or the person's smart phone signal, key fob, etc and the predetermined lighting is turned on/off, as desired. By way of further non-limiting example, various smart devices are activated to allow them to light up a neighbor's way through a neighborhood via a social media site.

Referring to FIGS. 8-30 generally, it is understood that the at least one predetermined controller 22, as explained and depicted in more detail previously and incorporated here, is provided that activates the lighting 16 in coordination with the detected signals (e.g., sensor signals). There is provided at least one controller 22 that is a predetermined controller, e.g., CPU, IR, Bluetooth, LTE/4G/5G, GPS, in-car control, ECU, UDX vehicle communications, or any other suitable control and any combinations thereof. Each lighting devices 16 includes at least one light element 24 (e.g., LED) with onboard or off board drivers (e.g., LED drivers), preferably, each with a plurality of light elements 24. The light elements 24 are controlled in 1-1000s of individual zones. These zones are controlled through matrix drivers onboard or near the LEDs. There is at least one predetermined archetectural control, as set forther in further detail previously. According to aspects of the present invention, the lighting system 10 is a discrete lighting module. In accordance with aspects of the present invention, the lighting system 10 is a compact, self-contained element that is bonded or overmolded into a component, e.g., a molding.

The Light elements 24 may be individual LEDs, Flecsform micro LED, micro LEDs, mini LEDs, flecsform printed with mircro and mini LEDs, organic light-emitting diode (OLED), micro LEDs 100-1000s on a circuit, or any other suitable lighting element and any combinations thereof. The light elements 24 may be single or multi zone, up to the thousands. The light elements 24 are white, amber, any color(s), or red/blue/green (RGB LED) to cover a full or partial palette, flashing, strobing, changing color, pattern, etc. The light elements 24 can incorporate additional optics for diffusion or focus or special appearance (emblems, graphics, characters, words, symbols, diffuse, metallic, metalized, thin optical element, opaque, transparent, translucent, frosted, etc). The light elements 24 may be integrated with a discrete light module, or embedded/molded/bonded into other exterior components, e.g., vehicle trim.

The plurality of detectors 14 are provided for detecting movement or proximity of a person 20, object, key fob 26, microchip, smart phone, smart watches, smart devices, computing devices or any other suitable predetermined device and combinations, such as a person approaching the vehicle 12. In accordance with aspects of the present invention, the present invention provides object/person detection from vehicle sensors and is integrated with other predetermined devices, e.g., watches, smart phones, built-in communication devices, preprogrammed, remote, or set lighting commands to identify a person's smart device presence to light the path in proximity, etc, to enable control of lighting in and/or around the vehicle. The detectors 14 are sensors, radar, lidar, camera, ultrasonic, capacitive seat sensor, non-contact obstacle/people detection devices, optical, infrared, magnetic, switches, capacitive, sensor device apparatus (wired or not wired) that senses pedestrians, mobile device communication (incorporating BLE-blue tooth low energy or other NFC-near field communication, etc to connect to devices wirelessly), or any other suitable detector, depending on the particular applications.

Referring to FIGS. 1-30 generally, it is understood that the lighting system 10 is adaptable depending on any predetermined applications and that any combinations of the aforementioned various arrangements and applications and apparatus are combinable and incorporated depending the on application without departure from the scope of the present invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An illumination system adapted for a vehicle, comprising:
   a plurality of detectors;
   a plurality of lighting devices comprising at least one lighting element;
   at least one controller that operably activates predetermined exterior lighting in coordination with predetermined sensor signals operably identifying where at least one individual, object and/or signal is located in a vicinity outside of the vehicle, wherein at least two of said plurality of lighting devices are adapted to be located along both opposing sides of a roof line of said vehicle and operably providing at least predetermined ground surface illumination; and said illumination system operably adapted for selectively linking autonomous sensors of the vehicle with a plurality of external predetermined software upload elements provided in predetermined locations operable to allow downloadable software updates of said external predetermined software upload element adapted for predetermined lighting effects.

2. The illumination system of claim 1, wherein the plurality of detectors include at least one sensor operable to detect the at least one individual in predetermined proximity to the vehicle and/or a predetermined preset signal emitted from an electronic device of the at least one individual, said at least one controller and said at least one sensor driving the at least one lighting element to direct light in predetermined proximity to the at least one individual or the signal.

3. The illumination system of claim 1, wherein a plurality of lighting devices is used and provide a follow-me feature that follows the at least one individual or predetermined preset signal around the vehicle.

4. The illumination system of claim 1, wherein the plurality of lighting devices provides a visual safety indicator to a ground surface that communicates a vehicle door is open.

5. The illumination system of claim 1, wherein the plurality of lighting devices provides predetermined illumination to communicate ride-hailing and ride-sharing availability or other messaging to pedestrians or a person who electronically requested ride-sharing.

6. The illumination system of claim 1, wherein the plurality of detectors are selected from the group consisting of sensors, radar, lidar, camera, ultrasonic, capacitive seat sensor, non-contact obstacle/people detection devices, optical, infrared, magnetic, switches, capacitive, wired sensor device apparatus wireless sensor device that senses pedestrians, mobile device communication, blue tooth low energy compatible, near field communication compatible and any combinations thereof.

7. The illumination system of claim 1, wherein the at least one light element is integrated with onboard or offboard light-emitting diode drivers.

8. The illumination system of claim 1, wherein the at least one light element is operably controlled in about 1 to over a thousand individual lighting zones.

9. The illumination system of claim 8, wherein lighting zones are operably controlled through matrix drivers onboard or near light elements that are light-emitting diodes.

10. The illumination system of claim 8, further comprising a predetermined electrical architecture that is digital, including via a digital signal and power enabled by a wired connection to control a predetermined number of zones.

11. The illumination system of claim 1, wherein the plurality of lighting devices uses wireless connectivity operably in communication with the plurality of detectors.

12. The illumination system of claim 1, wherein the plurality of lighting devices uses wireless power, solar or energy harvesting, with a battery or capacitor to enable no-wire connectivity operably in communication with the plurality of detectors.

13. The illumination system of claim 1, wherein the at least one light element is selected from the group consisting of individual light-emitting diodes (LED), micro LEDs, mini LEDs, organic LEDs and any combination thereof.

14. The illumination system of claim 1, wherein the at least one light element is single zone or multiple zones.

15. The illumination system of claim 1, wherein the plurality of lighting devices includes a plurality of LEDs that are the same or different colors.

16. The illumination system of claim 1, further including a controller to activate ground lighting in coordination with predetermined sensor signals identifying where an individual or individuals are standing, sitting or walking.

17. The illumination system of claim 1, wherein a distance the at least one individual is to the vehicle is from about 5 feet or less for the plurality of lighting devices to turn on.

18. An illumination system adapted for a vehicle, comprising:
a plurality of detectors;
a plurality of lighting devices comprising a plurality of lighting elements;
at least one controller to activate predetermined lighting in coordination with predetermined sensor signals operably identifying where at least one object is located in vicinity of the vehicle or where at least one individual is standing, sitting or walking in vicinity of the vehicle and identification including facial recognition, wherein the plurality of lighting devices selectively operably turn on/off or dim/brighten relative to the at least one individual's predetermined vicinity to the vehicle or predetermined signal location proximate to each respective of the plurality of lighting devices, and wherein at least one of said lighting devices is adapted to be located along both opposing sides of a roof line of said vehicle and operably providing at least predetermined ground surface illumination;
and said illumination system operably adapted for selectively linking autonomous sensors of the vehicle with a plurality of external predetermined software upload elements provided in predetermined locations operable to allow downloadable software updates of said external predetermined software upload element adapted for predetermined lighting effects.

19. The illumination system of claim 18, wherein the plurality of detectors are regional sensors that sense and track location of the at least one individual or a predetermined pre-programmed signal of at least one smart device.

20. An illumination system adapted for a vehicle, comprising:
a plurality of sensors adapted to operably detect, identify, and track a person, object or signal;
a plurality of lighting sources comprising a plurality of lighting elements operably controlled in a plurality of individual lighting zones, wherein the plurality of individual lighting zones are operably controlled through matrix drivers onboard or a predetermined distance near the plurality of lighting elements, and wherein at least one of said lighting sources is adapted to be located along a side roof line of said vehicle and operably providing at least predetermined ground surface illumination; and said illumination system operably adapted for selectively linking autonomous sensors of the vehicle with a plurality of external predetermined software upload elements provided in predetermined locations operable to allow downloadable software updates of said external predetermined software upload element adapted for predetermined lighting effects.

* * * * *